Patented Nov. 21, 1933

1,936,561

UNITED STATES PATENT OFFICE 1,936,561

RUBBER VULCANIZATION ACCELERATOR

Frederick Lewis Kilbourne, Jr., and John N. Street, Cuyahoga Falls, Ohio, assignors to The Firestone Tire & Rubber Company, Akron, Ohio, a corporation of Ohio No Drawing. Application January 17, 1931
Serial No. 509,536

9 Claims. (Cl. 18—53)

This invention relates to the art of producing vulcanized rubber, and more especially it relates to the production of such a product by the use of novel compositions for accelerating the vulcanization process.

A large number of nitrogen and nitrogen-sulfur containing compounds for accelerating vulcanization of rubber are known and commercially employed, among which di-ortho-tolyl-guanidine and 2-mercapto-benzo-thiazole are cited as examples. These compounds when added to the rubber mix before vulcanization improve the properties of the product and shorten the time required to effect vulcanization.

The use of a number of the above-mentioned compounds has a distinct disadvantage in that the accelerating power of the nitrogen and nitrogen-sulfur compound becomes effective during the compounding or processing of the raw rubber so that the latter is "set up" or partly vulcanized in the mill, calender, or tubing machine, or other apparatus in which the material is being handled. Accordingly, in the present invention we avoid the disadvantages mentioned by the use of a suitable retarder of vulcanization, namely, phthalic anhydride. The use of this material in the rubber compound eliminates "set up" or partial vulcanization during the interval of treatment and at the temperature encountered, in the mill, calender or tubing machine, but permits vulcanization of the rubber when the temperature is raised to the proper curing heat for the proper duration of cure.

Phthalic anhydride in its crystalline form, even when very finely ground, has the property of agglomerating, and thus when mixed with rubber, does not become thoroughly and uniformly dispersed therein. This is especially objectionable when the stock in which it is used is vulcanized only for a short time, since the locally concentrated phthalic anhydride causes a "spotty" cure with small areas undercured.

In order to avoid the aforesaid disadvantages inherent in the use of crystalline phthalic anhydride, we form a mixture of the three ingredients, namely, di-ortho-tolyl-guanidine, 2-mercapto-benzo-thiazole, and phthalic anhydride, by dissolving them in a suitable solvent to form a homogeneous mixture. It is found that a suitable solvent for this purpose which may be left in the material and which will impart beneficial characteristics in the compounding, milling and vulcanization of rubber, is stearic acid.

The resulting product is a yellowish brown, soapy material in which the respective ingredients have suffered little or no decomposition. It has a melting point of 59° C. and fluxes readily and is molecularly dispersed into a rubber mix on the compounding mill. An illustrative formula for this composition is:

| | Per cent |
|---|---|
| Stearic acid | 50 |
| Di-ortho-tolyl-guanidine | 21.6 |
| 2-mercapto-benzo-thiazole | 14.2 |
| Phthalic anhydride | 14.2 |

An advantage of the new blended accelerator is that its composition may be varied somewhat to suit the needs and requirements of the rubber stock in which it is to be used. It provides safe, cheap acceleration with no factory handling difficulties from scorched stocks or undispersed curing ingredients.

In the manufacture of this blended accelerator the stearic acid is melted, the di-ortho-tolyl-guanidine is stirred in, followed by the 2-mercapto-benzo-thiazole and finally by the phthalic anhydride. A clear homogeneous solution results at approximately 100° C. The material is then poured onto a suitable flat surface or chilled roller upon which the material immediately hardens and from which it may be scraped or removed as a cake.

The advantage of making our blended accelerator in this manner is that the material does not stick to the mill rolls when it is mixed with a rubber stock. Moreover, stearic acid has been found to appreciably improve the properties of a stock containing our blended accelerator. The use of this blended accelerator also results in the elimination of the disadvantages of using a fine dry powder in the milling of rubber, including the loss and toxic effects of the dust which blows about the mill room.

Another and important advantage of our improved form of accelerator is that it melts at the relatively low temperature of 59° and thus it will flux and become thoroughly admixed with the rubber when worked on a mill or calender, the temperature of rubber in such mill or calender averaging 80° C. with the maximum of 100° C. This advantage of applicants' new product is more apparent when we consider the melting points of its respective ingredients in their normal form, viz:

| | |
|---|---|
| Di-ortho-tolyl-guanidine | 163° C. |
| 2-mercapto-benzo-thiazole | 176° C. |
| Phthalic anhydride | 130° C. |
| Stearic acid | 69° C. |

When this accelerator is used in the vulcanization of rubber the acceleration of the cure is retarded at the temperature encountered on the compounding mill and in the tubing machine or calender in which the rubber batch is subsequently worked. It is found that the rubber does not begin to "set up" until temperatures between 260° F. and 370° F. have been reached. These temperatures are the limits within the range of which vulcanization is ordinarily carried out.

The cured stock used in this new accelerator is entirely free of uncured or "spotty" areas due to improperly dispersed retardant. It is further found that the modulus of elasticity and tensile strength of the cured product are equal to if not better than rubber cured from a mix containing the di-ortho-tolyl-guanidine and 2-mercapto-benzo-thiazole separately added to the batch.

It will be understood that our invention is not limited to the specific accelerators set forth, and that equivalent compounds may be used to obtain products in accordance with this invention. Thus in place of di-ortho-tolyl-guanidine, we may use other guanidines, such as tri-phenyl-guanidine, tolyl-phenyl-guanidine, or di-phenyl-guanidine, and in place of 2-mercapto-benzo-thiazole we may use, for example, mercapto-tolyl-thiazole, mercapto-xylyl-thiazole, or mercapto-naphthyl-thiazole to produce equally desirable accelerators.

Other modifications may be resorted to without departing from the spirit of the invention or the scope of the appended claims.

What is claimed is:

1. The process of producing a rubber vulcanization accelerator which comprises dissolving a mixture of di-ortho-tolyl-guanidine, 2-mercapto-benzo-thiazole, and phthalic anhydride in stearic acid.

2. A process of manufacturing vulcanized rubber which comprises heating a mixture of rubber and sulfur in the presence of an accelerator comprising di-ortho-tolyl-guanidine, 2-mercapto-benzo-thiazole and a retardant comprising phthalic anhydride dissolved in stearic acid.

3. The process of effecting the curing of rubber which consists in dissolving di-ortho-tolyl-guanidine, 2-mercapto-benzo-thiazole and phthalic anhydride in stearic acid to produce a blended homogeneous mass, incorporating the latter in a rubber mix, and vulcanizing the mix.

4. A composition comprising a solution of a mixture of a guanidine, a mercapto-thiazole and phthalic anhydride in stearic acid to form a homogeneous mass.

5. The vulcanized rubber product formed by heating a mixture of rubber and sulfur in the presence of a vulcanization accelerating composition comprising a solution of di-ortho-tolyl-guanidine, 2-mercapto-benzo-thiazole, and phthalic anhydride in stearic acid.

6. The process of producing a rubber vulcanization accelerator which comprises dissolving a mixture of a guanidine, a mercapto-thiazole, and phthalic anhydride, in stearic acid.

7. A process of manufacturing vulcanized rubber which comprises heating a mixture of rubber and sulfur in the presence of an accelerator comprising a solution of a guanidine, a mercapto-thiazole, and phthalic anhydride in stearic acid.

8. The process of effecting the curing of rubber which consists in dissolving a guanidine, a mercapto-thiazole and phthalic anhydride in stearic acid to produce a blended homogeneous mass, incorporating the latter in a rubber mix, and vulcanizing the mix.

9. The vulcanized rubber product formed by heating a mixture of rubber and sulfur in the presence of a vulcanization accelerating composition comprising a blended mass including a solution of guanidine, a mercapto-thiazole and phthalic anhydride in stearic acid.

FREDERICK LEWIS KILBOURNE, Jr.
JOHN N. STREET.